INVENTOR.
JOHN A. CURRIER

Sept. 12, 1967    J. A. CURRIER    3,340,707
METHODS AND MACHINES FOR STOCKING PRODUCTION
Filed March 26, 1964    7 Sheets-Sheet 2

INVENTOR.
JOHN A. CURRIER
BY
ATTORNEYS

Sept. 12, 1967          J. A. CURRIER          3,340,707

METHODS AND MACHINES FOR STOCKING PRODUCTION

Filed March 26, 1964          7 Sheets-Sheet 3

INVENTOR.
JOHN A. CURRIER
BY
ATTORNEYS

Sept. 12, 1967  J. A. CURRIER  3,340,707

METHODS AND MACHINES FOR STOCKING PRODUCTION

Filed March 26, 1964  7 Sheets-Sheet 4

INVENTOR.
JOHN A. CURRIER
BY

ATTORNEYS

Sept. 12, 1967 J. A. CURRIER 3,340,707
METHODS AND MACHINES FOR STOCKING PRODUCTION
Filed March 26, 1964 7 Sheets-Sheet 5
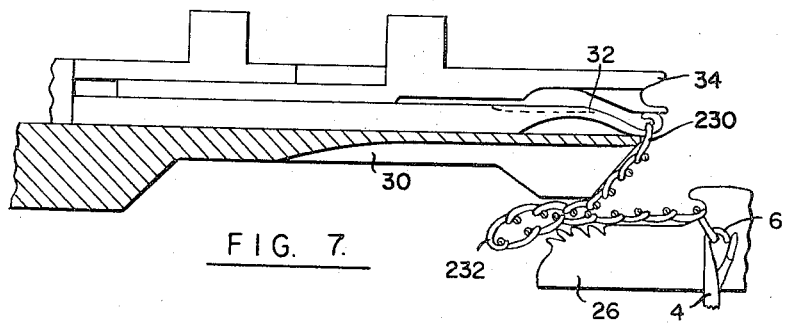
FIG. 7.
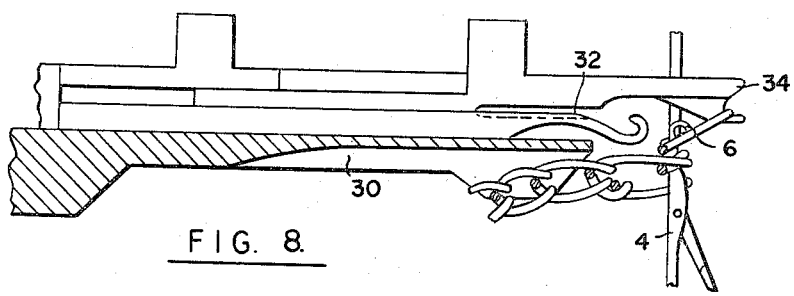
FIG. 8.
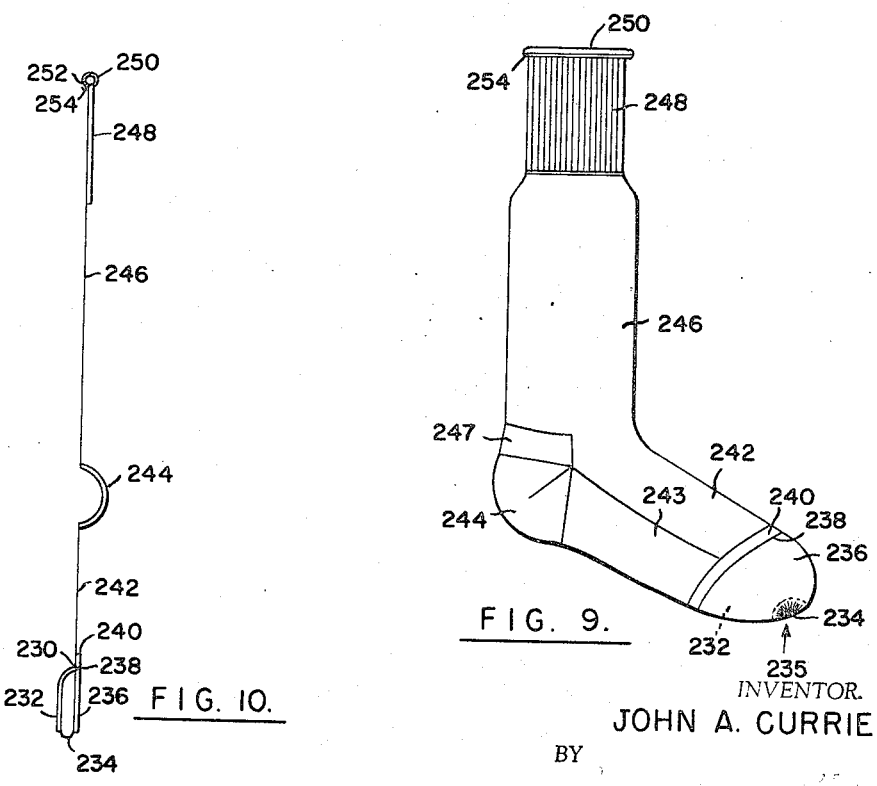
FIG. 9.
FIG. 10.
INVENTOR.
JOHN A. CURRIER
BY
ATTORNEYS Sept. 12, 1967  J. A. CURRIER  3,340,707
METHODS AND MACHINES FOR STOCKING PRODUCTION
Filed March 26, 1964  7 Sheets-Sheet 6

*INVENTOR.*
JOHN A. CURRIER
BY

ATTORNEYS

Sept. 12, 1967  J. A. CURRIER  3,340,707
METHODS AND MACHINES FOR STOCKING PRODUCTION
Filed March 26, 1964  7 Sheets-Sheet 7

INVENTOR.
JOHN A. CURRIER
BY

ATTORNEYS

United States Patent Office 3,340,707
Patented Sept. 12, 1967

3,340,707
METHODS AND MACHINES FOR STOCKING PRODUCTION
John A. Currier, Gilford, N.H., assignor to Scott & Williams, Incorporated, Laconia, N.H., a corporation of Massachusetts
Filed Mar. 26, 1964, Ser. No. 354,858
17 Claims. (Cl. 66—26)

This invention relates to stockings and methods and machines for production thereof, and has particular reference to the production of stockings which, except for boarding operations, are completed on a circular knitting machine, including toe closure.

Heretofore circular knit stockings have always involved obtaining from the knitting machine stocking blanks in the form of tubes, that is, having open toes. Closure of the toes has involved, in better grade stockings having shaped toe pockets, the necessity for the tedious and expensive looping operation. Looping further has involved the requirement that the stocking had to be turned inside out and then again reversed, the turning operations being also expensive.

In accordance with the present invention stockings are produced in which the toe is closed completely reliably for all commercial purposes. In a purely theoretical sense, the toe might be said not to be "closed" in that one could, by careful manipulation, demonstrate that the completed stocking was, in fact, still an open tube; but as a practical fact, the toe cannot open under any circumstances of normal handling even when the stocking is not worn, and when the stocking is worn the stretch existing over the toe of the wearer precludes completely any danger of opening.

In my application Ser. No. 302,868, filed Aug. 19, 1963, there is disclosed the application of the last mentioned type of toe closure applied to stockings of the type produced on knitting machines ordinarily used for the manufacture of ladies' sheer hosiery, these machines including transfer elements of the type ordinarily used for the production of turned welts. Such machines include a cylinder mounting independent needles, the transfer elements being carried by a cooperating dial. In accordance with that application, these dial elements cooperate with the needles to provide the toe closure. The present invention relates to the production of stockings having similar toe closures but produced on machines having both cylinder and dial needles and of the type ordinarily used for the knitting of rib tops of men's and children's hosiery or heavier types of ladies' sport hosiery. In view of the fact that actual needles are carried by the dial of such machines, construction and manipulations are somewhat different than those involved in the machines in which transfer elements, as contrasted with dial needles, are used. In accordance with the invention, dial needles function as transfer elements.

To provide a brief understanding of the nature of the invention prior to the following detailed description, reference may be made to procedures involved in the case of the machines having transfer elements as described in said prior application.

First, reference may be made to the conventional procedure of providing turned welts for ladies' sheer stockings. In accomplishing this, a makeup is effected and one of the initial courses is held by so-called transfer elements provided in a dial while knitting then continues on the needles. At the completion of the knitting of sufficient fabric to form the welt, the loops held by the dial elements are transferred back to the needles to provide the completed turned welt. In this operation each individual wale is essentially brought back to the needle at the position of its origination.

As described in said prior application, an operation very similar to what has just been mentioned is carried out, but now for the formation of a toe pocket, the stockings being knit toe first. Imagine, now, that during the formation of the fabric between the makeup and seizure by the transfer elements and the transfer operation that the dial is turned relatively to the needle cylinder through a sufficient angle of rotation. The result of this will be that the fabric referred to will be twisted and the transfer will involve bringing the beginning of each wale to a needle which, in general, would be displaced from the needle at which it might be said to have originated. If the relative rotation is, as desirable, through 360°, the beginning of a wale will be brought back into alignment with itself, but through a complete revolution.

There may now be visualized the result produced: if the relative rotation is angularly small, the twist produced would only provide a slight restriction of the opening of the resulting tube. But as the angle of relative twist is increased, the effective opening will be more and more restricted, until, when the angular displacement is of the order of 180° the restriction is quite complete, though in view of the possibility of distorting and stretching knitted fabric a person might still by manipulation be able to open the region at the twist to project a finger therethrough. But as the angle of twist becomes greater, such manipulation to provide an opening becomes rapidly more difficult; and as the twist approaches 360° effective manipulation of this type becomes almost impossible. Furthermore, such manipulation can be successful only if the fabric is slack; but if the fabric around the twist is stretched opening becomes quite impossible. The latter condition is, of course, that which exists when the stocking is worn. Then there exists no possibility that the toe of the wearer will project through what still remains a theoretically possible opening. Furthermore, the ordinary boarding operations set the fabric thus making the opening effectively impossible even through manipulation when the stocking is slack.

What has been described, of course, involves a toe of double fabric. But stocking toes are generally reinforced, being knit of heavier denier yarn than the sheer portions thereof or involving the addition of extra yarn. While, therefore, the toe pocket does consist of double fabric, yarn deniers may be chosen so that the resulting weight of fabric is no greater than that ordinarily involved in reinforcement, and highly effective reinforcement action is secured due to the fact that the double fabric components take up the total stress at the toes.

The twisted condition might also seem, on first consideration, to provide a bulky region which might be objectionable. This may be readily avoided, as described in said prior application, by providing a relatively sheer region of limited extent where the twisting occurs. But even without this, the increase in bulk is found to be completely unobjectionable since when the stocking is formed as indicated and boarded the region of tightest twist will be located, when the stocking is worn, beneath the normal arch which underlies the toes. It is thus accommodated without any discomfort. By reason of this location, furthermore, the twist is completely invisible when the stocking is worn with open-toed shoes.

Besides the advantages which have already been indicated involving the elimination of a necessity for looping and turning, there are outstanding advantages from the standpoint of production. Except for one deviation from the usual stocking there is no conflict whatever with the conventional other operations which are desired in the formation of a stocking. As specifically described, the stocking is produced on a two-feed circular knitting machine, but it will become obvious that the stocking may just as readily be made on a single feed machine or on a machine having more than two feeds such as a fourfeed or eight-feed machine. Heels may be knit by reciprocatory knitting, or if reciprocatorily knit pockets are not desired, other types of heel structures may be produced.

In accordance with the present invention, quite similar principles are involved in the production of a toe closure, but the invention achieves its results by the use of a machine having both dial and cylinder needles, the dial needles functioning as makeup and transfer elements in the knitting of the stocking toe first. Later, the dial needles are used in their normal function of producing rib tops, and finally termination of the stocking top is effected in such fashion as to resist ravelling.

As in the case of the ladies' machine referred to above, the machine may perform all of the ordinary operations involved in stocking production, this being advantageous in permitting generally conventional stockings to be produced in various well-known modifications. In particular, a substantial relative twist of the dial relative to the cylinder may be effected without interference with shogging movements between the dial and cylinder as are desirable for the production of most satisfactory rib fabric.

The general objects of the invention relate to the attainment of the foregoing objectives, and these as well as objects relating to details of construction and operation will become more apparent from the following description, read in conjunction with the accompanying drawings, in which:

FIGURE 7 is a fragmentary axial section illustrative of needle actions taking place in toe formation;

FIGURE 8 is a similar section illustrating transfer operation;

FIGURE 9 is a diagrammatic elevation of a stocking provided in accordance with the invention;

FIGURE 10 is a sectional diagram illustrative of the stocking and the steps involved in its formation;

Figure 1A:
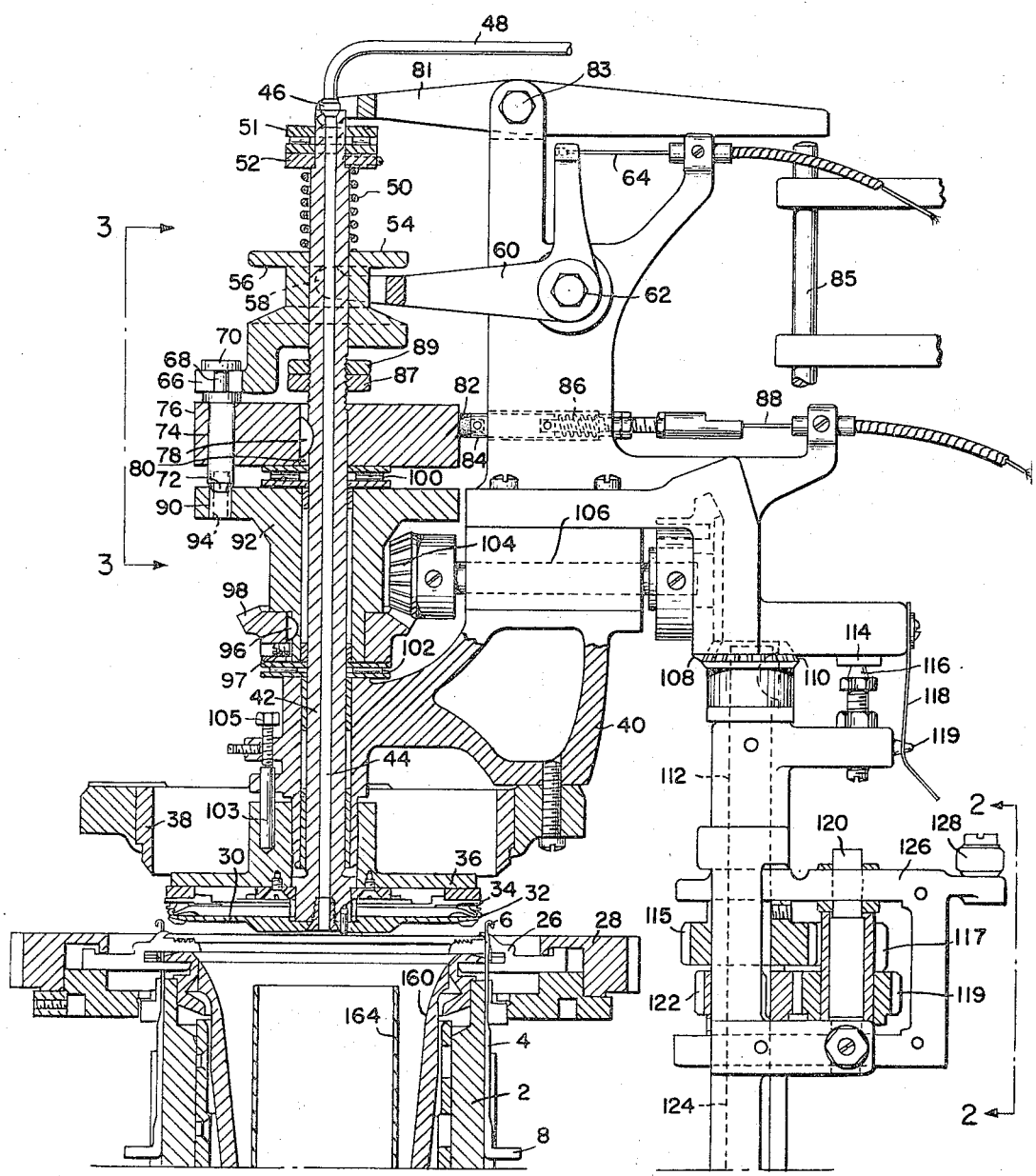
FIGURE 1A is a vertical section through the upper portion of a knitting machine embodying the invention.

The machine is, in general, an adaptation of a known rib machine and in various respects is similar in construction and operation to the machine illustrated in Lawson Patent 2,719,415, dated Oct. 4, 1955 to which reference may be made for various details of operation. Further background for the machine will be found in Scott Patent 1,641,101, dated Aug. 30, 1927. To simplify and clarify description, only so much of the basic machine will be described as is particularly pertinent to the present invention, it being understood that the machine is to a major extent conventional.

The machine comprises the usual slotted needle cylinder 2 slidably mounting the latch needles 4 having hooks 6 and associated pivoted latches and provided with butts 8 for cooperation with the usual cams. For further control of the needles the usual intermediate jacks 10 are provided carrying the butts 12, and below these in the same needle slots there are located the pattern jacks 14 pivoted at fulcra 16 and provided with the upper and lower butts 18 and 20 and with selectively removable butts 22 for pattern selection. The upper ends 24 of the pattern jacks are arranged to be acted upon by jack-tilting cams.

Associated with the needles are the usual sinkers 26 of which alternate sinkers are provided with saw teeth for fabric control. These sinkers operate conventionally and are controlled by cams carried by the sinker cap 28.

The rib needles are mounted in slots in the conventional dial 30 having the usual fins on its lower side, each needle comprising two elements 32 and 34 as described in the patents referred to above. The elements 32 may be referred to as hook elements, and the elements 34 as castoff elements. The dial cap 36 which is stationary mounts the cams acting upon the butts of the respective rib needle elements.

The usual latch ring is provided at 38, being pivoted in the usual fashion and surmounted by a frame structure 40 which serves to support various elements which will now be described.

The dial 30 is secured to a vertical shaft 42 provided with a central opening 44 for the passage of compressed air introduced through a tube 48 coupled to the shaft by a bushing 46 permitting rotary movement of the shaft with respect to the tube. A compression spring 50 reacts between a collar 52 secured to the shaft 42 and a collar 54 slidable on the shaft. This last collar is provided with a circumferential groove 56 within which there engages the end 58 of a bell crank 60 pivoted at 62 to the supporting frame 40 and arranged to be operated by a Bowden wire 64 against the force exerted by the spring 50. The Bowden wire 64 is controlled through a conventional push rod acted upon at proper times by one or more cams mounted on the conventional cam drum of the machine.

The collar 54 is provided with a downwardly and laterally extending portion slotted at 66 to embrace a reduced portion of a vertical pin 68 provided with a head 70 so that when the collar 54 moves upwardly the pin 68 will be raised. The pin 68 is mounted in a vertical opening 74 in a collar 76 which is secured to rotate with the shaft 42 by a key 78 engaged in a slot 80 of the collar to provide a splined connection. The vertical position of the collar 76 is fixed; but the shaft 42 and its associated parts (the dial, dial cap, etc.) must be vertically movable, and their position is adjusted by a lever 81 bearing on the top of the thrust-bearing 51, pivoted at 83 and arranged to be acted on by a push rod 85 which is actuated by cams on the main cam drum of the machine. The lever 81 acts as a variable stop limiting upward movement of the collar 52 under the action of spring 50. The variations in vertical position of the dial, etc., are for the purposes described in the Scott patent, i.e. to lower it for the makeup, transfer and rib knitting operations and to raise it at other times in accordance with the present invention. Downward movement of the dial is limited by the engagement of an adjustable nut 87 with collar 76. Nut 87 is held in adjusted position by a lock nut 89.

A brake is provided to act on the cylindrical periphery of the collar 76. This brake comprises the plunger 84 slidably mounted in the bracket 40 and carrying at its inner end a friction element 82 of leather or the like. The plunger is arranged to be urged inwardly by a compression spring 86 seated in the bracket 40 and its outer end is connected to a Bowden wire 88 arranged to be acted upon by one or more cams on the main cam drum of the machine through a conventional push rod. A pull on the Bowden wire 88 disengages the brake from the collar.

Figure 3:
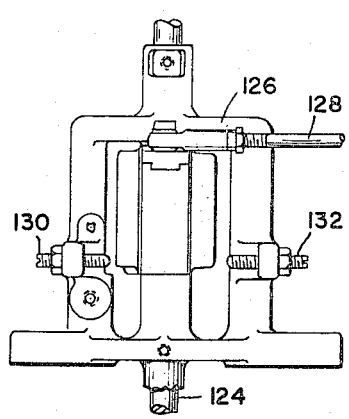
FIGURE 3 is a fragmentary elevation looking at the left-hand side of FIGURE 1A as indicated by the plane 3—3 in that figure.
Figure 2:
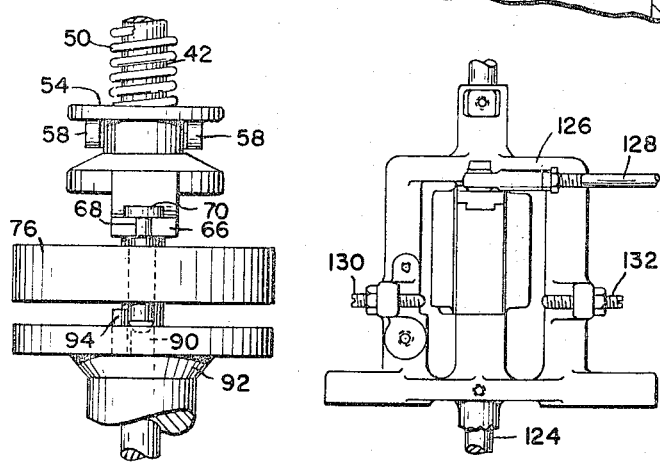
FIGURE 2 is a fragmentary elevation looking at the right of FIGURE 1A as indicated by the plane 2—2 of that figure.

Referring to FIGURE 3 in addition to FIGURE 1A, pin 68 is provided with a tapered lower end 72 engageable in the upper end of an opening 90 in a member 92 which is journalled on the shaft 42. The member 92 is provided with an upstanding pin 94 arranged to engage and drive the pin 68 when the latter is in its lower position, and has its end 72 engaged, for accurate alignment, in the upper end of the opening 90.

Keyed to the member 92 at 96 and further held by a set screw 97 is a bevel pinion 98. The assembly of the various parts just described and provision for relative rotations are effected through the use of the thrust bearings 100 and 102 along with cylindrical bearings illustrated in FIGURE 1A but which will not be specifically described.

The dial cap 36 moves vertically with the shaft 42 and dial 30 but is held against rotation by the pin 103 carried by it and extending into a hole in the bracket 40. Upward movement is limited by an adjustable stop screw 105.

Meshing with the bevel pinion 98 is a bevel gear 104 secured to a horizontal shaft 106 journalled in the frame 40. At its outer end this frame carries a bevel gear 108 meshing with a bevel pinion 110 secured to the upper end of a drive shaft 112. To maintain the gears 108 and 110 in mesh the frame 40 which, as previously stated, is secured to the pivoted latch ring, has a pad 114 arranged to rest on an adjustable stop 116 carried by a fixed portion of the machine frame. A fixed position is maintained by a spring latch 118 carried by the frame 40 and having a hole engageable over a pin 119 carried by the fixed portion of the machine frame.

The shaft 112 is journalled in a fixed portion of the machine frame and carries at its lower portion a pinion 115 which meshes with a pinion 117 mounted on a stud 120 carried by a bracket 126 pivoted on the lower end of the shaft 112 and the upper end of a shaft 124 which is coaxial with the shaft 112 and similarly journalled in the machine frame. To the pinion 117 there is secured the coaxial pinion 119 which meshes with a pinion 122 secured to the shaft 124. A link 128 has one end pivoted to the bracket 126 and serves to impart oscillatory movement to this bracket under the action of cams on the main cam drum of the machine, the motion of the bracket being limited by the adjustable stop screws 130 and 132. The elements just described will be recognized as corresponding to similar elements in the Lawson patent referred to above. They serve to provide shogging movements to the rib needles, a planetary drive being provided by the pinions 115, 117, 119 and 122 between the input driving shaft 124 and the output shaft 112. Assuming for the present that a direct drive is provided between the shaft 112 through the gears 110 and 108, the shaft 106, and the gears 104 and 98 to the dial, the operation is the same as that described in the Lawson patent to change the relative positions of the dial and cylinder needles. In the present case the train of drive may be interrupted at desired times by release of the pin 68 from the opening 90 and the pin 94.

The shaft 124 carries the pinion 134 meshing with a driving bevel ring gear 136 secured to the bevel gear 140 which, in turn, is secured to the main drive shaft 138. This main drive shaft is conventionally driven for rotation and reciprocation as is common in machines of this type. To effect cylinder drive, the bevel gear 140 meshes with the sleeve gear 144 for the sleeve portion 146 extending upwardly within the needle cylinder and splined thereto as indicated at 148. The needle cylinder may be vertically movable for the change of stitch length, and for this purpose there is provided the vertically movable tube 150 having a follower acted on by the usual tension cams. This tube supports the bearing 152, the lower element of which is stationary with the tube 150. An upper element of this bearing acts through the usual pins 154 to raise and lower the needle cylinder. For this purpose the pins 154 are slidable in the sleeve gear.

A funnel-shaped insert 160 has its upper end mounted within and by the sinker ring to rotate therewith and is provided with air escape openings 161. At its lower end it is secured by a set screw 162 to a fabric-receiving tube 164, which at its upper end is located below but adjacent to the dial 30. At its lower end this tube 164, which rotates, is continued as the stationary tube 166 which is connected to a centrifugal fan to provide suction, the tube 166 being desirably of transparent plastic so that the progress of knitting may be observed. To provide for the relative rotation involved, a fitting 168 carried by the upper end of the stationary tube 166 is provided with a seal and bearing 170 within which the tube 164 rotates.

Figure 4:
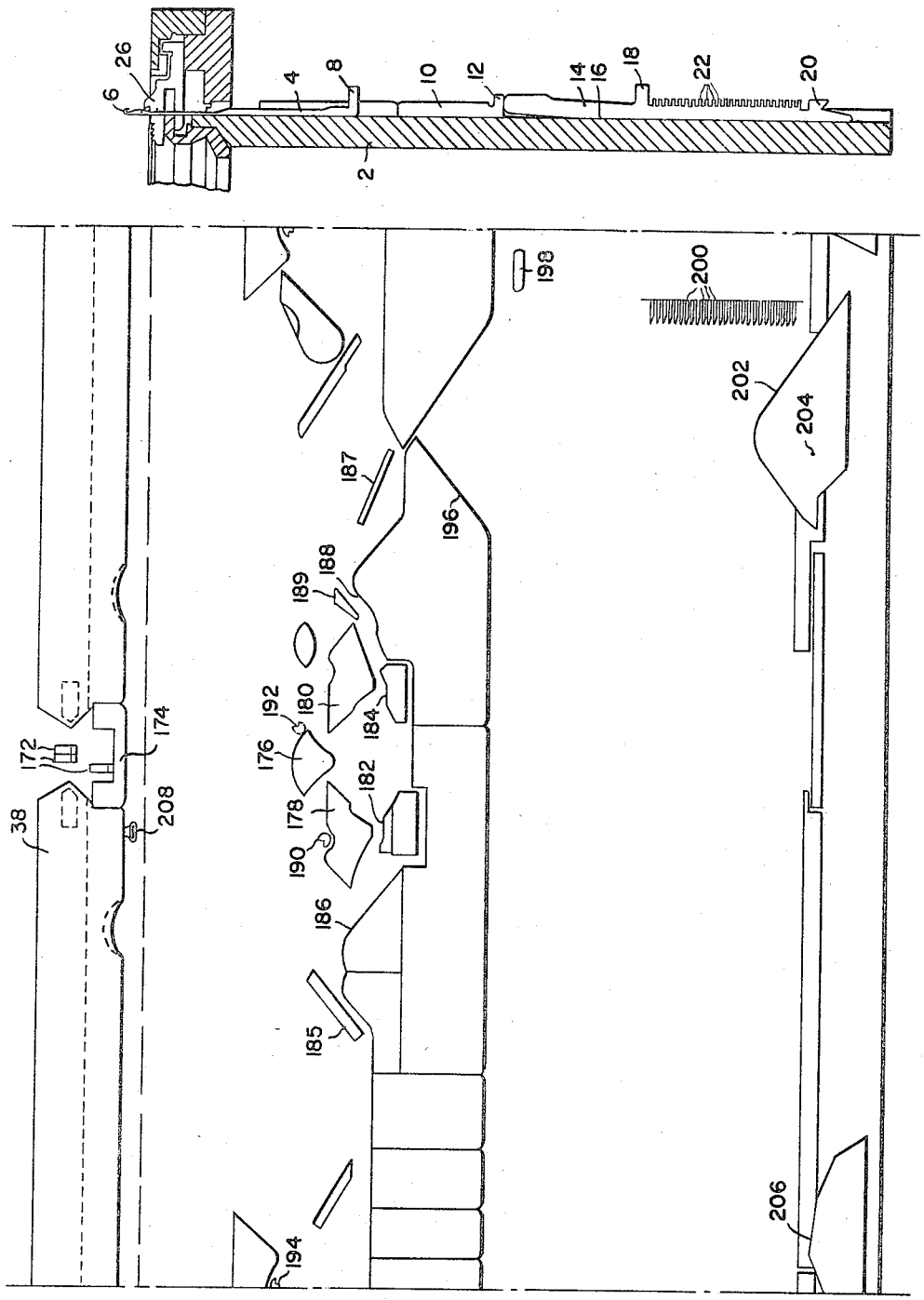
FIGURE 4 is an inside development of the elements, including cams, cooperating with needles and associated elements of the machine, there being indicated at the right of this figure in alignment with the other elements a section of the needle cylinder and movable elements carried by it and associated therewith.

Reference may now be made to FIGURE 4 which illustrates particularly the cams controlling cylinder needles and the jacks associated therewith. The machine illustrated is a single-feed machine, though it will be evident that a machine having two or more feeds may be used for carrying out the invention. As illustrated, yarns are fed from the usual replaceable fingers 172 over the throat plate 174 carried by the latch ring 38. The preferred use of yarns of various weights will be referred to hereafter.

The cams operating on the butts 8 of the needles 4 comprise the usual center cam 176 and the respective forward and reverse stitch cams 178 and 180 with which are associated the landing cams 182 and 184. Cams 186 and 188 raise needles to tuck level. For the formation of heel pockets the usual picks 190 and 192 are provided as well as the usual dropping pick 194. Cams 185 and 187 respectively lower all needles and elevate those selected to receive loops or stitches from the dial needles during the transfer operation. Other conventional cams are indicated in FIGURE 4 but need not be particularly described since they have their usual functions.

A lowering cam 196 is provided to act on the butts 12 of the intermediate jacks 10. In the illustrated machine no other cams are provided for acting on the butts 12, since needle selection is effected by control of pattern jacks 14. For these there is provided the cam 198 serving to engage the upper ends of these jacks to project for selection the lower ends thereof. Selection is effected by the conventional action of pattern wheel-controlled cams 200 on the selectively removable butts 22. Engagement of a butt 22 by a cam 200 will rock inwardly the lower butt 20 of a pattern jack to cause it to miss the rise 202 of the cam 204. Jacks whose lower ends are not thus moved inwardly ride up the rise 202 which engages the notches below their butts 20, thereby causing the intermediate jacks to be moved upwardly and, in turn, the needles to cleared level to pass above the cam 189. This cam is in action when selection takes place so as to lower unselected needles to pass at welt level beneath the cams 180 and 178. The pattern jacks are depressed by the action of cam 196 on the intermediate jacks and are leveled by the cam 206.

The selections afforded by the operations just described are used for various purposes as will later appear.

An inwardly directed nozzle 208 provides a blast of air to aid fabric tensioning and takeup as will be later described.

Figure 5:
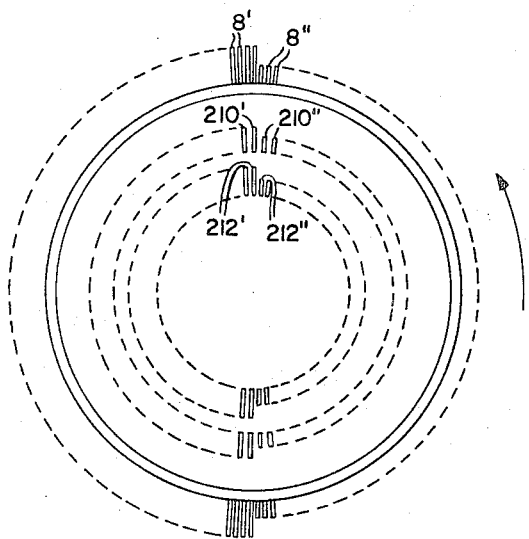
FIGURE 5 is a diagram illustrating the distribution of operating butts.

FIGURE 5 illustrates the arrangement of butts of the cylinder needles and of the hook and cast-off elements. While the number of cylinder needles is arbitrary, it may be assumed that there are 160 needles in the cylinder and 80 needles in the dial. Cylinder needles which are to provide the instep of the stocking have long butts 8' and those needles which will form the heel have short butts 8". While half the circle may be made of each, the distribution may be otherwise effected if narrow heels are to be made. If desired, other length butts may be provided in the two series, but in view of the provision of jack selection, selections of needles for other purposes may be made through the use of the jacks.

The hook elements 32 are provided with butts of two lengths 212′ and 212″ essentially corresponding to the arc of the long butt and short butt cylinder needles. Similarly the cast-off elements 34 may be provided with long and short butts 210′ and 210″, respectively, arranged in corresponding fashion. The long and short butt series of the elements correspond closely to the long and short butt series of the cylinder needles, since the purpose of the different butts in the case of the elements is for the purpose of making possible the introduction of cams into action and their removal from action, with operations initiated and terminated at predetermined elements, in order that a course of loops may be properly seized by the cylinder needles and dial hook elements, and held by the latter until subsequently transferred to the former. Alternatively, the hook elements may be projected to seize yarn and in conjunction with their cast-off elements knit with the cylinder needles to form rib fabric.

Figure 6:
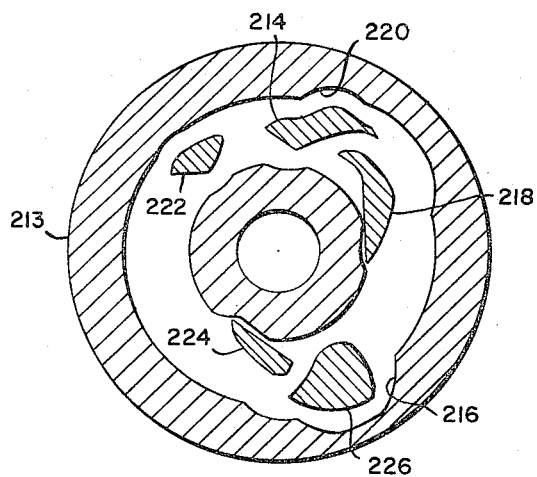
FIGURE 6 is a horizontal section showing the arrangement of dial cams.

The cams for operating the dial elements are illustrated in FIGURE 6 and are conventional. The cams comprise the outer ring member 213 having a suitable internal contour. The cams 214, 218 and 220 taking part in knitting by the dial needles are shown solid and hatched, cams 214 and 218 being vertically movable as a group to move them into and out of action, while the cams which are vertically movable as a group to render the dial needle elements operative for transfer are illustrated in dotted outline at 224 and 226, the cam surface 216, also involved in the operation, being formed in the ring 213. The cam 214 is the stitch cam and is located as usual with respect to the feedpoint defined by the throat plate 174. Cam 222 is fixed and insures that hooks 32 and cast-offs 34 are in their inactive or loop holding positions as seen in FIGURE 7.

The sequence of operations involved and details of the structure of a stocking provided in accordance with the invention may be best appreciated by considering first the general aspects of the stocking construction with reference to FIGURES 9 and 10. FIGURE 9 is a diagrammatic elevation of the improved stocking as it appears at the time of preboarding, while FIGURE 10 is, in effect, a section of the stocking, the right-hand side of this figure representing the outside of the stocking. In this section single lines indicate lighter fabric and double lines heavier fabric, produced by selective yarn substitutions.

Makeup is effected at 230, and loops are retained on the hook elements of the dial needles while the toe is being knit on active cylinder needles. The knitting of the toe involves the formation of three successive portions 232, 234 and 236, the former and the latter being formed of heavier yarns or combinations of yarns while the intermediate portion 234 is formed of lighter yarn to provide location of the twist and less bulk thereof. The twisting is indicated in FIGURE 9 at 235. At the completion of the toe, the loops held by the dial needles are concatenated with cylinder needle loops at 238. Heavier yarn or yarns are then desirably continued to provide a ring toe 240, knit on all the cylinder needles, whereupon lighter weight yarn is substituted for the knitting of the foot portion 242, though an auxiliary yarn may be incorporated for formation of a reinforced sole 243. The heel 244 is then knit by reciprocatory knitting, desirably with the substitution of heavier yarn.

Following completion of the heel, knitting is resumed to form the leg 246 during the initial portion of which an extra yarn may be inserted for partial courses in accordance with conventional practice to produce the high splice area 247.

Following the completion of the leg portion 246 a transition to rib knitting is effected and a rib top is formed as indicated at 248 by the conjoint action of cylinder and dial needles. At the completion of the rib top, a short tubular welt 250 is knit on cylinder needles up to a line 252 at which the doubled fabric is closed, and the stocking is finished off by the knitting of a tab 254 on cylinder needles only, this being preferably effected with the introduction of a light yarn which promotes curling to resist ravelling. Finally, the stocking is pressed off in its completed form.

The operations involved in the knitting of a specific stocking will now be described, though it will be evident as the description proceeds that variation of the details of the steps may be made.

Preparation for the makeup on bare needles involves the division of the cylinder needles through the action of the pattern jacks to render alternate cylinder needles operative and the intermediate needles inactive. The dial needles are now aligned circumferentially with the intermediate inactive cylinder needles. One, or possibly two, yarn fingers are now put into action. The initial makeup is that conventionally used in starting stockings on this type of machine, and need not be described in detail. Briefly stated, the yarn or yarns are drawn by the dial needles and the active cylinder needles, and after the formation of a complete round the dial needles are rendered inactive. The inactive dial needles now hold yarn loops in their hook elements. Thereafter the cylinder needles continue to knit. The height of the cylinder is adjusted in usual fashion to secure proper length of stitches, and as seen in FIGURE 7 the dial is elevated sufficiently to permit the fabric to pass freely above the saw teeth of the sinkers without being depressed by the dial fins.

In conventional knitting on a machine of this type, the makeup generally precedes the formation of a rib top by only sufficient courses for the fabric to reach and be tensioned by the saw teeth of the sinkers, and consequently a minimum number of courses are knit on the active cylinder needles. In the present instance, however, the knitting following makeup is to form the toe, and instead of merely the formation of a small turned welt, considerable length of fabric is knit. If the makeup is with more than one yarn, the auxiliary yarn is removed and the knitting proceeds with a yarn in use which is suitable for the major portion of the toe.

The knitting proceeds to form the toe fabric indicated at 232. It will be evident that since only half the cylinder needles are knitting that the fabric then produced is a rather open one as compared with what will ultimately form the leg of the stocking. However, this is not objectionable but, rather, is desirable because, as will appear, fabric of this structure is doubled upon itself to provide the toe of the stocking, and while this is desirably reinforced by the use of a relatively heavy yarn, too much bulk is undesirable. The adjustment of the stitch length is such that, considering the final product, the toe fabric will have the desired weight. Knitting as just described continues until the completion of the desired length of the toe portion 232, which length may be short of half the total length of the toe fabric to a greater or less degree depending upon the final product desired.

The same type of knitting then proceeds with the substitution of a lighter yarn to provide the portion 234 of the toe fabric which, as will shortly appear, is that involved at the tighter region of the twist. This is then followed by the restoration of the original toe yarn to provide the remaining toe fabric 236 which may have a length the same as or nearly the same as the length of the portion 232.

Figure 13:
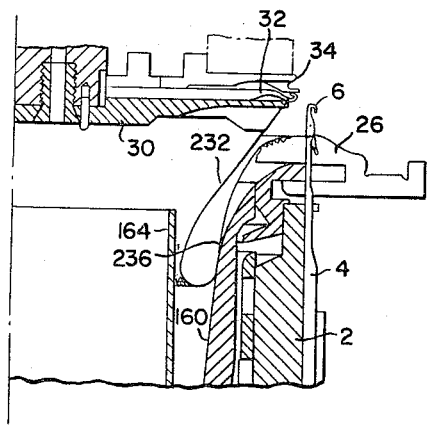
FIGURES 13, 14 and 15 are vertical sections, partially diagrammatic, explanatory of the knitting sequence in the formation of the toe and foot.

What occurs during the last mentioned knitting will be made clear from FIGURES 7 and 13. The former illustrates the condition following the makeup and after the formation of a substantial group of courses on the active cylinder needles. The makeup course 230 is held by the hooks of the elements 32 which are located in withdrawn position as shown. The fabric 232, folded upon itself, is fed inwardly by the operation of the sinkers, half of which are provided with saw teeth while the remaining ones are plain. However, as previously described, following the makeup the dial was raised to permit the fabric to move freely from the needles without being engaged by the saw teeth as their only function is in conjunction with the downwardly extending fins of the dial 30 when in its lowered position, to tension the fabric during rib knitting and the transfer operation. The fabric thus accumulates as an annular loop running from the course 230 to the course being produced by the alternate cylinder needles. If a stocking of relatively heavy fabric such as a man's stocking is being produced, the normal action of the sinkers will usually suffice to move the fabric loop properly inwardly and downwardly. But this action may be augmented, particularly if lighter fabric is being produced, by the introduction of air through the nozzle 208 (FIGURE 4). The introduction of this air balloons the annular fabric loop and flows through the fabric, escaping from the annular space between the liner 160 and tube 164 through the openings 161 (FIGURE 1B) so that the loop is extended into this space in a smooth unwrinkled fashion (FIGURE 13).

While the toe may be made throughout without the change to the lighter yarn for the formation of the intermediate fabric portion 234, this yarn change to lighter yarn is desirable to provide a band of relatively thin fabric to absorb the folds caused by the twist and prevent them from radiating from the center of the twist to the borders of the toe. This also holds the fabric at the center to a minimum thickness since the twist will increase the apparent thickness where it occurs.

Before the fabric portion 236 is completed a relative 360° twist is effected between the dial and the needle cylinder.

Figure 1B:
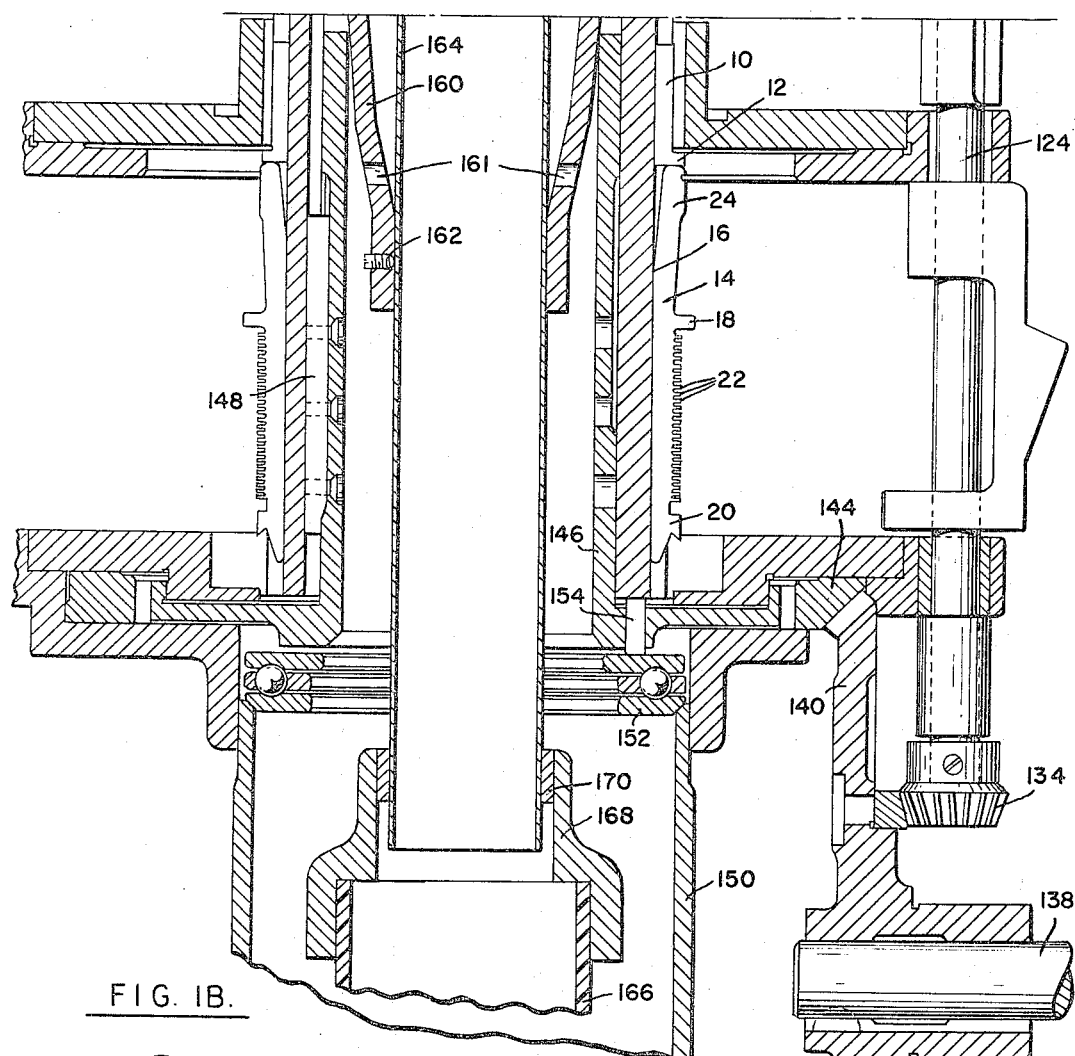
FIGURE 1B is a vertical section forming a continuation of the lower end of FIGURE 1A.

Mechanically this is effected as follows:

Up to this point the dial and cylinder have been rotating in unison, the member 92 being driven at the same speed as the needle cylinder through the interconnecting gearing shown in FIGURES 1A and 1B, with the pin 70 located in the socket 90 and driven by the pin 94. When the twist is to be effected, the main cam drum through conventional followers effects a pull on the Bowden wire 64 and release of the Bowden wire 88. The former rocks the bell crank 60 to effect lifting of the pin 70 out of its socket and clear of the pin 94. At the same time the brake 82 is released to engage the member 76 under the action of spring 86 to restrain movement of the dial which is connected to the member 76 through the shift 42. The result is that the dial is held stationary while the needle cylinder continues to rotate. Prior to the completion of a single rotation of the needle cylinder, the Bowden wire 64 is released to cause the pin 70 to drop on the upper surface of member 92 to be reengaged by the pin 94 and caused to fall into the socket 90 which insures accurate realignment between the dial and cylinder in their original relative position. Release of the brake by pulling Bowden wire 88 eliminates restraint on subsequent simultaneous movement.

The result of the foregoing is that the fabric between the cylinder needles and the hook elements of the dial needles is given a 360° twist about its axis. The nature of what occurs will be made most clear from consideration of FIGURES 11, 12 and 14, the last showing the toe pocket as it lies immediately following the twist. Because of the smooth extension of the fabric loop as already described, the twist will be uniform from a circumferential standpoint and the center of the twist will be located substantially in the axis of rotation, the fabric loop being drawn out of the annular space to lie across the upper open end of the tube 164.

Figure 11:
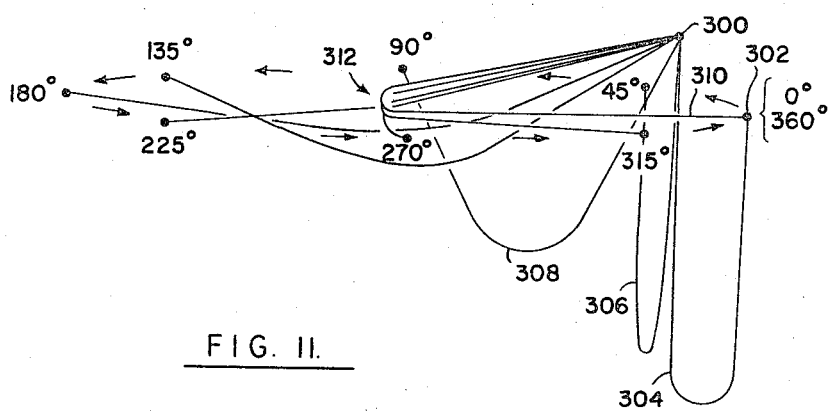
FIGURE 11 is a semi-perspective diagram illustrating what occurs in the twisting operation.
Figure 12:
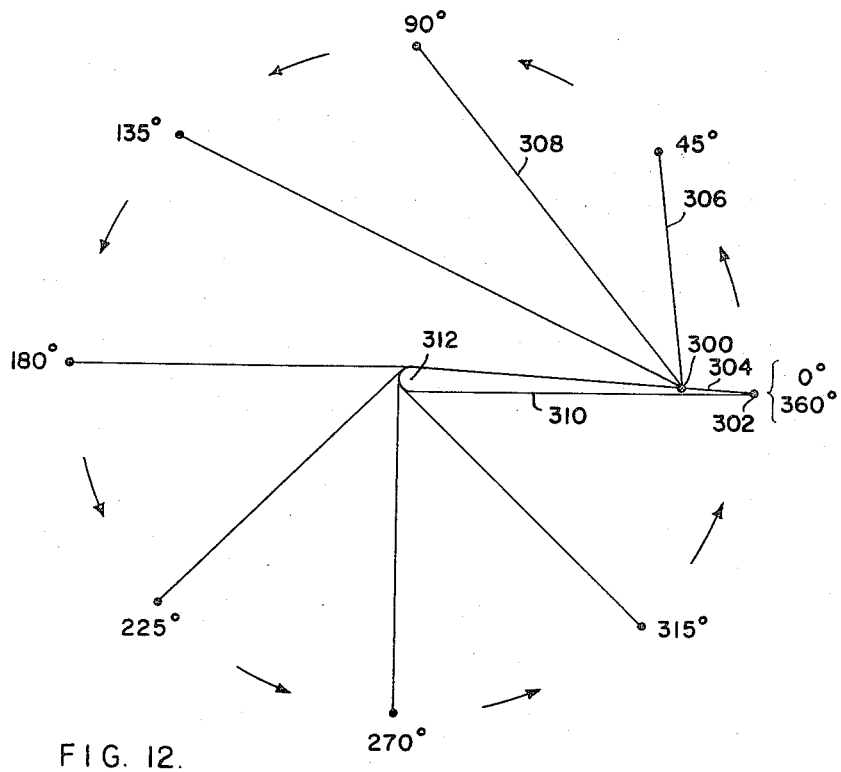
FIGURE 12 is a diagram in plan showing the same matters as FIGURE 11.

The nature of the effected twist may be best visualized from consideration of FIGURES 11 and 12 which are diagrammatic and indicate the progress of a single wale which is, in effect, anchored at 300 to the dial and at 302 to a cylinder needle. The progress of this wale for 45° intervals in the relative rotation is indicated. At the beginning of the twist (0°) this wale will take the form of a loop 304 essentially in an axial plane, this loop extending in the annular space outside tube 164. After the needle cylinder has advanced 45° relative to the effectively stationary dial, this wale will occupy a position diagrammed at 306 in the figures, while after 90° of relative rotation it will occupy the position indicated at 308. The remaining successive steps in its position will be evident from the degree markings in the figures, and finally the wale will occupy the position 310 after 360° of relative rotation. Because of the twist involving all of the other wales of the fabric, the wale under consideration will finally run from the point of anchorage in the dial at 300 about the center 312 of the twist and thence back to its needle 302 which now has made a relative rotation of 360°.

Figure 14:
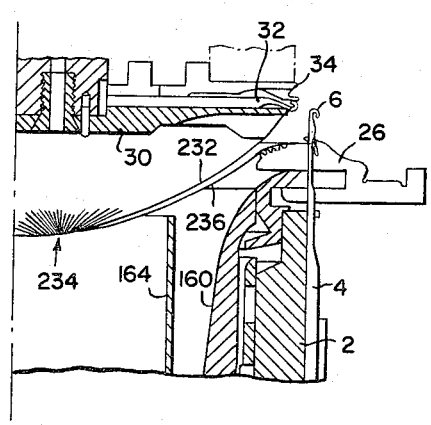

FIGURE 14 indicates the resulting location of the fabric as twisted. The central region of twist at 234 will lie above the center of the tube 164. Because of the interposition of the relatively thin fabric at the location 234 the folds of the twist will be essentially limited to this thin fabric, the portions of the fabric at 232 and 236 which are of heavier weight remaining relatively smooth.

The twist of the fabric may take place at any time after the partial formation of the portion 236 of the fabric, but preferably takes place just before this portion of the fabric is completed. When the desired length of the fabric portion 236 is knit, transfer of the loops held by the dial needles is effected to the previously inactive cylinder needles. This transfer may be effected in all respects like that normally involved in the transfer of rib lops to the inactive cylinder needles in the usual termination of rib knitting; but in the present case the formation of rib fabric may be totally avoided or, at least, shortened to no more than a few courses. In explanation of this it may be remarked that in the usual formation of a rib top stocking, after completion of the turned welt the rib needles are rendered active, by bringing into operation the stitch cams, to knit rib fabric, such fabric being knit on the dial needles and the previously active cylinder needles. Such rib knitting is then conventionally continued until the desired length of rib top is produced, and only thereafter are stitches transferred from the rib needles to the previously inactive cylinder needles. In the present case, however, the loops held by the rib needles from the makeup may be transferred directly to the previously inactive cylinder needles by the same conventional procedure which has been used after the completion of the rib top. The transfer involves the type of opeartion which is illustrated in FIGURE 8. The elements 34 are projected outwardly carrying the loops previously held by the hook elements 32, this projection being to such extent as to position such loops to be penetrated by the previously inactive cylinder needles which are raised by selection effected by the pattern jacks. The elements 34 are then withdrawn, leaving these loops on the inactive cylinder needles which then become active, passing through the knitting wave along with the previously active cylinder needles. Plain fabric is thus started on all of the cylinder needles and the result of the foregoing is the closure of the twisted fabric loop forming the toe. If desired, of course, the dial needles may be operated to form one or more courses of rib fabric before the transfer to the cylinder needles takes place.

Knitting then proceeds in conventional fashion to form, first, a ring toe such as indicated at 240 following the transfer which occurs at 238. This ring toe may be formed of the same yarn as that which formed the portion 236 of the toe fabric. This heavier yarn is desirably then replaced by the yarn which forms the instep 242. If desired, a reinforced sole 243 may be produced by inserting an additional yarn to form partial courses. This may be effected in usual fashion, either by causing the additional yarn finger to "beat" or by selective taking of the double sole yarn by needle selection alone.

Figure 15:
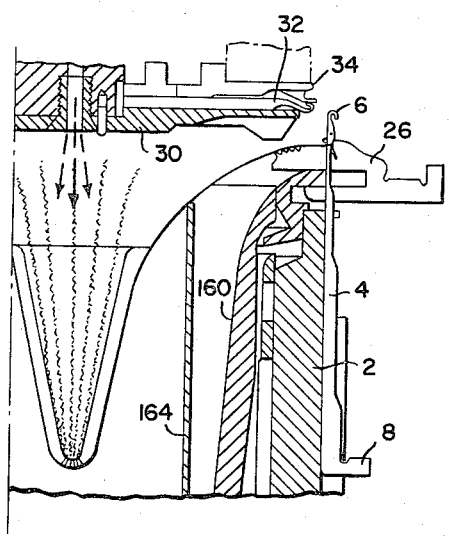

During formation of the sole of the stocking it is desirable to introduce from tube 48 through the bore 44 of the shaft 42 intermittent blasts of air to drive the toe downwardly into the upper end of the tube 164. This operation will be evident considering the sequential conditions illustrated in FIGURES 14 and 15. The air blasts tension properly the previously produced fabric to effect the proper formation of the sole stitches. Takeup means other than air may be used for this purpose, for example the takeup may be effected by the lowering of a weighted rod through the shaft 42 to engage the toe pocket and force it downwardly. The air now escapes through the fabric previously formed, passing outwardly from the lower end of the tube 164. This air flow is desirably continued throughout the formation of the sole, heel and leg portions of the stocking.

Following completion of the sole, the rotation of the needle cylinder is changed to reciprocation and the heel 244 is formed on the heel needles in conventional fashion, the instep needles being raised to inactive position. The only difference from conventional heel formation is due to the fact that the stocking is knit toe first rather than top first, so that the lower portion of the heel is first knit by narrowing and then the upper portion is knit by widening.

Following completion of the heel, the leg is started by rotary knitting on all of the cylinder needles, and here again, if desired, an auxiliary yarn may be introduced for the formation of the high splice 247. Following completion of the high splice, the splicing yarn is removed and the leg is then completed by rotary knitting with a single leg yarn.

Consistently with the mechanism so far described, a 2 x 1 rib top will be produced following the completion of the leg. It may be here noted, for explanation, that the mechanism so far described cannot be used to produce a 1 x 1 rib top unless modified in view of the fact that loops cannot be transferred from cylinder needles to dial needles, but transfer can only be effected, as described, from dial needles to cylinder needles. Accordingly, the rib top will be produced on the dial needles and all of the cylinder needles resulting in the 2 x 1 structure.

The change from leg knitting to the rib top knitting is effected as follows:

The dial is shogged by the shogging mechanism which has been described to align the dial needles between pairs of cylinder needles. The dial is lowered so that the saw tooth sinkers may tension the rib fabric, the dial needle cams are rendered operative in conventional fashion, and the fed yarn which continues to be knit by all of the cylinder needles will be initially laid in the hooks of the dial elements 32 and will thereafter be knit to form the rib stitches in conventional fashion.

After the desired length of rib top is produced, the dial knitting cams are rendered inactive, and the dial is raised, allowing the dial needles to remain in inward position such as illustrated in FIGURE 7. The dial needles thus hold the stitches formed in the last course of rib knitting, and the cylinder needles continue to knit plain fabric. During this formation of plain fabric on all of the cylinder needles, the dial is shogged to align the dial and cylinder needles in the same fashion as was originally described: i.e., the dial needles are aligned with the cylinder needles of that group which, in the initial formation of the toe, were inactive, though these needles are now active. A short length of welt fabric 250 is now formed. When sufficient of this fabric, which is plain, is knit, the dial stitches are transferred to the cylinder needles with which they are aligned in the same fashion as was previously described for the transfer at 238, though in this case they will be transferred to needles already carrying loops.

Following the transfer, the dial elements 34 are withdrawn inwardly while knitting continues on all of the cylinder needles. The result of the operations before transfer is the production of a short tubular welt to form the upper edge of the stocking.

Desirably, immediately after the transfer a light yarn is substituted for that previously forming the rib top, so that the plain fabric which is produced as the final step in the operation will have an increased tendency to curl and thus prevent ravelling. Finally, the yarn finger is withdrawn so that press-off will occur and the stocking will drop from the needles. The air blasts will then move the stocking to discharge position if it does not tend to drop of its own weight. Following the final transfer mentioned above the dial may be shogged to position for the beginning of the next stocking.

While, theoretically, the stocking could ravel beginning with the last course of the small tab 254, the fabric of this tab will normally curl and the tubular welt provided at 250 will sustain circumferential tension as the stocking is worn, so that the loops of the tab will not be stretched and ravelling will, therefore, not normally occur. However, if desired, the tab may have incorporated in it, along with its normal yarn of, say, nylon, an easily fused very light yarn of thermoplastic type which will soften and act as an adhesive during the usual preboarding finishing operation.

In the foregoing description of the operation, details of manipulations have not been stressed since they may be followed in quite conventional fashion. As described in said Scott patent, in effecting the various operations there are desirably changed the height relationships between the dial and the needle cylinder. These, in general, serve to control the optimum sizes of stitches produced and also serve to get the dial out of the way during knitting confined to cylinder needles to avoid accidental entrapment of the yarn or yarns. Provision is made for such movement in the present machine through the use of the mechanism for moving the dial downwardly against the pressure of the spring 50, control being from suitable cams on the main cam drum. Also omitted from the description have been the conventional details involved in rendering cams active and inactive. Such actions are accomplished as usual, by moving cams going into action against the ends of short butts so that they will first act to move long butts, during the passage of which the cams are moved fully into active positions. Removals are effected by moving the cams outwardly to position to miss short butts while they are acting on long butts, the cams being then moved fully outwardly to miss long butts as the short butts are passing them. It will be further evident that where needle selections are involved the pattern jacks will effect these in conventional fashion.

Mention has been made above that with the mechanism described 1 x 1 rib tops cannot be produced. However, only a slight modification is required to produce 1 x 1 rib, namely the provision of the same number of dial needles as cylinder needles. In such case the makeup will be essentially as described above, except that the dial will be shogged to a position to align the dial needles with the spaces between cylinder needles, alternate ones of which will be active while the intermediate ones will be inactive. This means that during makeup two dial needles will be projected between each two active cylinder needles, so that the makeup yarn will be first taken by a cylinder needle, then by a pair of dial needles, then by the next active cylinder needle, and so on. Following makeup, the toe fabric will be produced as described on the active cylinder needles while the dial needles hold their loops. At the end of the formation of the toe fabric the transfer will be essentially as described except that, noting that a pair of dial hooks will actually carry only a single loop, the loop of such pair will be transferred to the previously inactive cylinder needles. In other words, a pair of cast-off elements will project a bight of yarn beyond the position of the inactive cylinder needle between them, so that when this needle is raised and the cast-off elements are withdrawn the bight will be engaged by that needle going into operation.

The 1 x 1 rib will be started as described above with the exception that all cylinder needles will remain in action, the dial needles being aligned with the spaces between the cylinder needles through which they will be projected to knit. The rib fabric will, of course, have a number of wales corresponding to the total number of cylinder and dial needles. The tubular welt corresponding to 250 of FIGURES 9 and 10 will be formed with the dial needles inactive, and transfer will ultimately occur from the dial needles to all of the cylinder needles.

While the formation of a heel by reciprocatory knitting has been described, it will be obvious that the foot and leg may be formed as a continuous tube, the heel being provided simply by boarding.

While many alternatives may be adopted in the matter of formation of the stocking after the completion of the novel toe, what may be stressed is the fact that the formation of this toe does not conflict in any fashion with the adoption of conventional knitting procedures which are carried out with no more than due regard to the fact that the stocking is being knit toe first. There is thus achieved a great advantage in that the machine may be to a major extent conventional with operations carried out with which knitting machine operators are thoroughly familiar. In fact, as will be evident from the description of the mechanical construction of the machine, it itself is highly conventional except for the provision of the arrangement enabling the dial to drop back relatively to the needle cylinder.

Mention has already been made of the fact that an effective toe closure can be produced by providing a twist of less than 360°. So long as the twist at least approaches 180° the closure is effective, and substantially unopenable except with difficulty if the twist exceeds 180° even by a relatively small portion of a revolution. However, from the practical standpoint, the 360° rotation as described is desirable because of the fact that it restores all of the machine elements to initial and normal position. When such position is achieved, there is not involved any difficulty in the matter of timing cam changes or the like. Conventionally, for cam changing, differentiation of lengths of butts of movable elements is provided, and unless they are located in proper positions when cam changes are made difficulties of operation exist. There is no advantage from the standpoint of the stocking in providing a twist of less than 360°.

Reference may finally be made to FIGURE 9 which shows the sole of a stocking as it appears on the foot of a wearer. With boarding properly carried out, the twist 234 will be located beneath the arch of the toes and hence completely unobjectionable from the standpoint of being felt even if it involves some bulking of the fabric. This advantage is achieved even if the toe is made of heavier yarn or yarns throughout; but if the twist is made, as described, in a region of relatively sheer fabric, the bulking is almost non-existent, the twist is quite stable in its location in the stocking and will not shift about, so that if properly located in boarding it will remain where desired beneath the toes and therefore invisible.

It will be evident from the foregoing that while the formation of stockings has been primarily considered, the invention may be used for the formation of knitted tubes closed on the knitting machine at one end thereof, such tubes being usable in certain cases for bandaging or the like. Bags may also be provided in this fashion.

References to forwardly and reversely concatenated stitches are to those stitches respectively formed by cylinder and dial needles which are drawn in reverse fashions through preceding loops.

It will be apparent from the foregoing that various changes in details of the product, processes and machines provided in accordance with the invention may be made, and it will therefore be understood that the invention is not to be considered as limited except as required by the following claims.

What is claimed is:

1. The method of knitting a product on a circular knitting machine having a circle of needles, a circle of elements associated with the needles, and members cooperating therewith, which method comprises producing an initial circular portion of fabric, holding said initial portion on said elements while continuing knitting by the needles to form successively first and second tubular plies including a junction therebetween, prior to completion of said second ply imparting a relative twist between said elements and said needles through a substantial angle about the axis of said machine, at the completion of said second ply transferring to said needles said held initial portion, and thereafter forming a portion of fabric as a continuation of the foregoing having both forwardly and reversely concatenated loops by conjoint knitting by said needles and elements.

2. The method of claim 1 in which said angle of twist is in excess of 180°.

3. The method of claim 1 in which said angle of twist is substantially 360°.

4. The method of knitting a product on a circular knitting machine having needles, a circle of elements associated with the needles, and members cooperating therewith, which method comprises producing an initial circular portion of fabric, holding said initial portion on said elements while continuing knitting by the needles to form successively first and second tubular plies including a junction therebetween, prior to completion of said second ply imparting a relative twist between said elements and said needles through a substantial angle about the axis of said machine, at the completion of said second ply transferring to said needles said held initial portion and then continuing the knitting of a tubular portion of fabric containing both forwardly and reversely concatenated loops.

5. The method of knitting a stocking on a circular knitting machine having needles, a circle of elements associated with the needles, and members cooperating therewith, which method comprises producing an initial portion of fabric, holding said initial portion on said elements while continuing knitting by the needles to form successively first and second tubular plies including a junction therebetween, prior to completion of said second ply imparting a relative twist between said elements and said needles through a substantial angle about the axis of said machine, at the completion of said second ply transferring to said needles said held initial portion, thereby to provide a twisted fabric fold providing a toe pocket, and then continuing the knitting of at least foot and leg portions of the stocking with the latter containing both forwardly and reversely concatenated loops.

6. The method of claim 5 in which said angle of twist is in excess of 180°.

7. The method of claim 5 in which said angle of twist is substantially 360°.

8. The method of knitting a stocking on a circular knitting machine having needles, a circle of elements associated with the needles, and members cooperating therewith, which method comprises producing an initial portion of fabric, holding said initial portion on said elements while continuing knitting by the needles to form successively first and second tubular plies including a junction therebetween, prior to completion of said second ply imparting a relative twist between said elements and said needles through a substantial angle about the axis of said machine, at the completion of said second ply transferring to said needles said held initial portion, thereby to provide a twisted fabric fold providing a toe pocket, and then continuing the knitting of at least foot and leg portions of the stocking with the latter containing both forwardly and reversely concatenated loops to provide a rib top.

9. The method of knitting a stocking on a circular knitting machine having needles, a circle of elements associated with the needles, and members cooperating therewith, which method comprises producing an initial portion of fabric, holding said initial portion on said elements while continuing knitting by the needles to form successively first and second tubular plies including a junction therebetween, prior to completion of said second ply imparting a relative twist between said elements and said needles through a substantial angle about the axis of said machine, at the completion of said second ply transferring to said needles said held initial portion, thereby to provide a twisted fabric fold providing a toe pocket, then continuing the knitting of at least foot, leg and turned welt portions of the stocking, and terminating the stocking after completion of the turned welt by formation of a circular tab to prevent ravelling, with said leg portion containing both forwardly and reversely concatenated stitches.

10. The method of knitting a product on a circular knitting machine having two circular beds, elements constituting needles operating in both of said beds, and members cooperating therewith, which method comprises producing an initial circular portion of fabric, holding said initial portion on elements operating in one of said beds while continuing knitting by the elements operating in the other bed to form successively first and second tubular plies including a junction therebetween, prior to completion of said second ply imparting a relative twist between said beds through a substantial angle about the axis of said machine, at the completion of said second ply effecting continued knitting including said held initial portion and said second ply thereby to form a closed twisted loop of fabric, and thereafter forming a portion of fabric as a continuation of the foregoing having both forwardly and reversely concatenated loops by conjoint knitting by said needle elements in both of said beds.

11. The method of claim 10 in which said angle of twist is in excess of 180°.

12. A circular knitting machine comprising a pair of circular coaxial beds, needle elements mounted for movements in both of said beds, devices cooperating with said elements for their operation and the formation of stitches, elements mounted in a first one of said beds being arranged to hold a tubular knitted portion of fabric during further rotary knitting of fabric by elements mounted in the second of said beds, means for maintaining said beds in fixed relative angular relationship during an initial part of an operation, means for effecting a relative angular shift in excess of approximately 180° between said beds during a subsequent part of an operation while the tubular knitted portion of fabric is held by elements mounted in the first of said beds and while loops of fabric are held by elements in the second of said beds, means for continuing knitting by elements in said second bed only, with seizure by the last mentioned knitting of the tubular knitted portion of fabric theretofore held by elements in the first of said beds, thereby to form a closed twisted loop of fabric and means for thereafter effecting knitting by needle elements in both of said beds to produce fabric having both forwardly and reversely concatenated loops.

13. A circular knitting machine according to claim 12 in which said angle of twist is substantially 360°.

14. A circular knitting machine according to claim 12 in which loops of said held portion of fabric are concantenated with loops formed in the last mentioned knitting.

15. A circular knitting machine comprising a needle cylinder, independently movable needles mounted in said cylinder, elements cooperating with said needles for the formation of stitches, a dial mounted concentrically with said cylinder, needles mounted in said dial throughout its circumference and arranged to hold a tubular knitted portion of fabric produced by said cylinder needles during further rotary knitting of fabric and to transfer thereafter the held portion of fabric to the cylinder needles, means for maintaining said dial in fixed angular relationship with the needle cylinder, and means for effecting a relative angular shift between said dial and the needle cylinder about the axis of the needle cylinder while the needles mounted in the dial hold said portion of fabric, means for effecting transfer of loops from said dial needles to the cylinder needles, means for thereafter continuing knitting of tubular fabric by said cylinder needles, thereby to form a twisted pocket in the fabric, and means for effecting knitting by both cylinder and dial needles to produce fabric having both forwardly and reversely concatenated loops.

16. A circular knitting machine according to claim 15 including a fabric-receiving tube extending axially within the needle cylinder, and means effecting movement into said tube of the twisted fabric produced by said relative shift between the dial and the needle cylinder.

17. A circular knitting machine comprising a needle cylinder, independently movable needles mounted in said cylinder, elements cooperating with said needles for the formation by stitches, a dial, needles mounted in said dial and arranged to hold loops of a knitted initial portion of tubular fabric produced by said cylinder needles during further knitting of fabric and of a type to transfer thereafter loops to the cylinder needles, means for maintaining said dial in fixed angular relationship with the needle cylinder, means for effecting a relative angular shift in excess of 180° between said dial and the needle cylinder while the dial needles hold said initial portion of tubular fabric, thereby to form a twisted loop of fabric, means for effecting closure of said twisted loop of fabric by seizure of said initial portion during continued knitting, means thereafter producing a plain knit portion of tubular fabric continuous with said twisted loop following transfer of loops from the dial needles to said cylinder needles, and means for effecting knitting by both cylinder and dial needles to produce fabric having both forwardly and reversely concatenated loops.

References Cited

UNITED STATES PATENTS

| | | | |
|---|---|---|---|
| 1,270,083 | 6/1918 | Williams | 66—187 |
| 1,270,084 | 6/1918 | Williams | 66—95 X |
| 1,328,580 | 1/1920 | Miller | 66—95 |
| 1,737,787 | 12/1929 | Miller | 66—187 X |
| 1,891,956 | 12/1932 | Sirmay | 66—26 |
| 2,255,068 | 9/1941 | Lawson et al. | 66—26 X |
| 2,408,807 | 10/1946 | Norman | 66—1 |
| 2,719,415 | 10/1955 | Lawson | 66—28 X |

FOREIGN PATENTS 723,309   2/1955   Great Britain.

MERVIN STEIN, *Primary Examiner.*

UNITED STATES PATENT OFFICE
CERTIFICATE OF CORRECTION

Patent No. 3,340,707                                September 12, 1967

John A. Currier

It is certified that error appears in the above identified patent and that said Letters Patent are hereby corrected as shown below:

Column 16, line 55, "1,737,787" should read -- 1,738,787 --.

Signed and sealed this 2nd day of December 1969.

(SEAL)
Attest:

Edward M. Fletcher, Jr.
Attesting Officer

WILLIAM E. SCHUYLER, JR.
Commissioner of Patents